United States Patent [19]

Kuepper

[11] Patent Number: 4,989,722
[45] Date of Patent: Feb. 5, 1991

[54] APPARATUS FOR TRANSPORTING YARN PACKAGES

[75] Inventor: Wilhelm Kuepper, Wegberg, Fed. Rep. of Germany

[73] Assignee: W. Schlafhorst & Co., Fed. Rep. of Germany

[21] Appl. No.: 252,816

[22] Filed: Oct. 3, 1988

[30] Foreign Application Priority Data

Oct. 3, 1987 [DE] Fed. Rep. of Germany ....... 3733510

[51] Int. Cl.$^5$ ............................................. B65G 47/34
[52] U.S. Cl. ............................. 198/475.1; 198/476.1; 198/703; 198/797
[58] Field of Search ............... 198/797, 798, 703, 706, 198/710, 712, 475.1, 476.1, 485.1, 486.1, 477.1; 242/35.5 A

[56] References Cited

U.S. PATENT DOCUMENTS

| | | | |
|---|---|---|---|
| 2,219,410 | 10/1940 | Bradshaw | 198/477.1 X |
| 2,615,557 | 10/1952 | Hapman | 198/706 X |
| 3,664,482 | 5/1972 | Kornylak | 198/476.1 X |
| 3,774,859 | 11/1973 | Brouwer et al. | 242/35.5 A X |
| 4,142,626 | 3/1979 | Bradley | 198/797 |
| 4,184,584 | 1/1980 | Dehlen | 198/706 |
| 4,185,733 | 1/1980 | Heikinheimo | 198/477.1 X |
| 4,304,325 | 12/1981 | May et al. | 198/477.1 X |
| 4,576,341 | 3/1986 | Matsui et al. | 242/35.5 A |
| 4,722,433 | 2/1988 | Gough | 198/706 |

FOREIGN PATENT DOCUMENTS

| | | |
|---|---|---|
| 0080574 | 6/1983 | European Pat. Off. . |
| 2446162 | 4/1976 | Fed. Rep. of Germany . |
| 2138926 | 3/1979 | Fed. Rep. of Germany . |
| 3227038 | 3/1983 | Fed. Rep. of Germany . |
| 3535354 | 4/1986 | Fed. Rep. of Germany . |
| 3525460 | 2/1987 | Fed. Rep. of Germany . |
| 1395104 | 3/1965 | France . |
| 322728 | 4/1970 | Sweden ........................... 198/476.1 |
| 430529 | 8/1967 | Switzerland ................... 242/35.5 A |
| 1231092 | 5/1971 | United Kingdom ............. 198/485.1 |

Primary Examiner—Joseph E. Valenza
Assistant Examiner—D. Glenn Dayoan
Attorney, Agent, or Firm—Shefte, Pinckney & Sawyer

[57] ABSTRACT

An endless belt is driven between two yarn processing machines. A plurality of package carrier members are mounted at spaced intervals to the endless belt by pivot connections which permit the carrier members to travel in freely pivotal hang disposition. The carrier members support packages thereon to transport the packages from one machine to the other. A contact member adjacent the machine receiving the supported packages contacts the carrier members to release the supported packages therefrom as the carrier members travel thereby.

11 Claims, 5 Drawing Sheets

APPARATUS FOR TRANSPORTING YARN PACKAGES

BACKGROUND OF THE INVENTION

The present invention relates to an apparatus for transporting wound yarn packages from one yarn processing machine to another yarn processing machine. More particularly, the present invention relates to an apparatus for transporting yarn packages from a spinning machine to a preparation station or a winding machine with the path of transport being in both horizontal and vertical directions.

German Offenlegungsschrift No. 36 30 670 discloses an apparatus for transporting packages. The apparatus includes a first pair of generally vertical guide rails with package supporting members having discs guided between the guide rails and having pegs extending perpendicularly from the discs for supporting packages thereon. The transport path extends from the first generally vertical section along a horizontal section to a second, generally vertical final section. The package supporting members rest on an endless belt which moves them along the transport path between the guide rails, but the package supporting members are not fixed to the endless belt. This apparatus has the disadvantage that a high amount of force is required to propel the package supporting members along the vertical sections of the transport path. Since the discs are not fastened to the endless belt, the discs must be frictionally engaged by the guide rails as they are propelled upward along the vertical sections by the endless belt. Consequently, the power requirements to move the endless belt are substantially increased due to the frictional resistance between the discs and the guide rails. Moreover, some slippage between the discs and the guide rails will normally occur, thereby adversely affecting the efficiency of the transport of the packages.

SUMMARY OF THE INVENTION

The present invention provides an apparatus for the continuous transportation of yarn packages from one yarn processing machine to another yarn processing machine. More specifically, the present invention provides a yarn package transport apparatus for transporting packages along vertical and horizontal paths with the transported packages being maintained at predetermined spacings from one another.

Briefly described, the apparatus for transporting yarn packages includes an endless belt extending between the machines with means for driving the belt, and a plurality of package carrier members having means for supporting packages thereon. The package carrier members are mounted by pivot connections to the belt at spaced intervals in freely pivotable hanging disposition for maintaining the package supporting means in package supporting disposition as the carrier members travel on the belt from one machine to the other. Additionally, the apparatus includes means adjacent the receiving machine for pivoting the carrier members with respect to the belt to release the supported packages therefrom as the carrier members travel thereby.

Preferably, the package supporting means are generally U-shaped for supporting packages thereon with the axes of the packages generally horizontal. Preferably, the U-shaped package supporting means hang freely below the pivot connection during movement of the carrier members. In a modification of the preferred embodiment, the package supporting means include a lower surface and an upstanding surface with the lower surface sloping upwardly from the upstanding surface to support a package with one end of the package on the lower surface and the package in leaning disposition against the upstanding surface. Preferably, the upstanding surface is rearward of the lower surface with respect to the direction of travel of the carrier member.

In the preferred embodiment, the carrier members include a contact portion spaced from their respective pivot connections. Preferably, the means for pivoting the carrier members includes a stationary member disposed near the path of the carrier members to engage the contact portions for pivoting the carrier members about their pivot connections as they travel to permit packages to fall from the carrier members.

In another modification of the preferred embodiment, the apparatus includes a pair of spaced guide members disposed adjacent one of the machines and engagable with the carrier members at spaced locations thereon for pivoting the carrier members into package receiving disposition as the carrier members travel therepast.

The apparatus of the present invention advantageously transports the yarn packages without any relative movement between the carrier member and the package and without any undesired stress or strain on the outer layer of the bobbin. Moreover, the apparatus for the present invention accomplishes the unloading of the packages from the carrier members by the simple and reliable method of tipping the carrier members to allow the packages to slide therefrom.

In one form of the present invention the carrier members are arranged to carry the packages with their axes generally horizontal.

In another form of the present invention, the carrier members are designed to carry packages in generally upright disposition.

Further features and advantages of the present invention will be apparent from the accompanying drawings and following detailed description of the preferred embodiments.

DETAILED DESCRIPTION OF THE PREFERRED EMBODIMENTS

Figure 1:
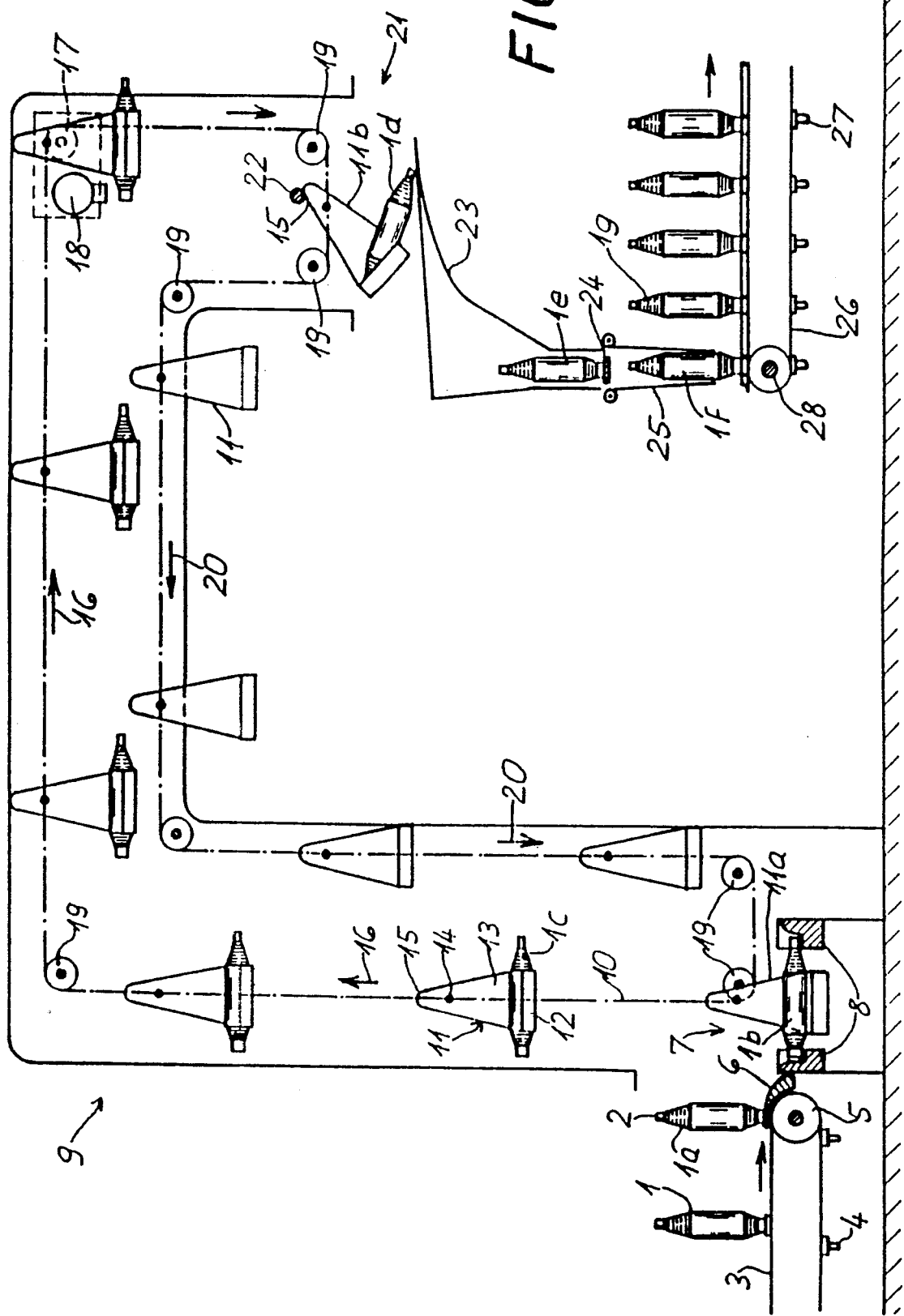
FIG. 1 is a side elevational view of one preferred embodiment of the transport apparatus of the present invention, showing the loading of a horizontally aligned yarn package previously conveyed from one yarn processing machine and the unloading of another package at a second conveyor for transport to another yarn processing machine.

As shown in FIG. 1, textile packages 1 of yarn wound on spindles 2, are transported away from a machine (not shown) by a conveyor 3. A plurality of regularly spaced pegs 4 on the conveyor 3 receive the packages 1 thereon and hold them upright.

At an end pulley 5 of the conveyor 3, a removal blade 6 engages and lifts the tubes 2 from the pegs 4. Once the tubes 2 and their packages have been lifted by the removal blade 6, the packages 1 slide along the top surface of the removal blade 6 and tip forward at a loading station 7 into a horizontal position in a positioning holder 8, which supports each package 1 by the respective ends of its tube 2 so that an upwardly moving carrier member can engage and receive the underside of the package 1. The conveyor 3 operates continously so that as a package 1 tips forward into the positioning holder 8, a second package 1 is being lifted from its respective peg 4 by the removal blade 6.

The loading station 7 forms part of a transport apparatus 9 of the present invention which also includes an endless belt 10 that moves a plurality of package carrier members 11 pivotally connected thereto at regular spacings from one another. The endless belt 10 can be constructed of chain, rubber material or any other suitable material.

Figure 2:
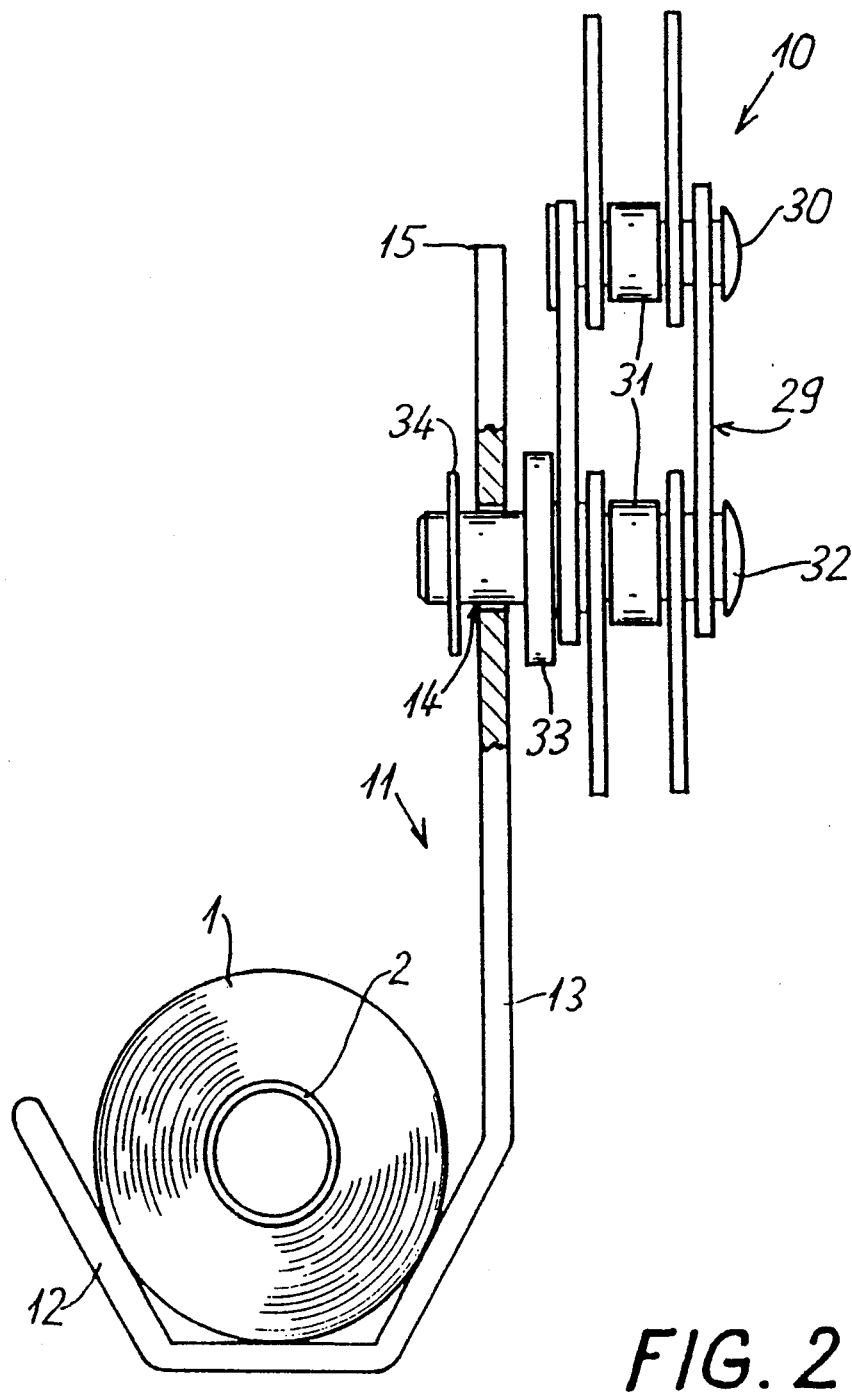
FIG. 2 is an end elevational view of one of the package carrier members of the transport apparatus of FIG. 1, showing the horizontally disposed package supported thereon.

As best seen in FIG. 2, each carrier member 11 includes package supporting means of generally U-shape with one leg 12 shorter than the other leg 13. The longer leg 13 is spaced below a pivot opening 14 that lies above the center of gravity of the carrier member 11. The carrier member 11 also includes a contact portion 15 above the pivot opening 14.

With reference again to FIG. 1, a carrier member 11 is shown receiving a horizontally oriented package 1b held in the positioning holder 8. Another carrier member 11a has already received and now supports a package 1c. The carrier members 11 and 11a transport the packages along the path indicated by arrows 16.

A drive roller 17 driven by a motor 18 contacts the endless belt 10 to drive the belt along the transport path. A plurality of guide rollers 19 guide the endless belt 10 along the transport path indicated by the arrows 16, with each carrier member 11 carrying a package. Along the return path, indicated by the arrows 20, each carrier member 11 is empty. The transport apparatus 9 of the present invention provides the flexibility to transport the packages 1 in any number of horizontal and vertical directions without any change in the relative position between the packages 1 and the respective carrier members 11 in which they are transported.

The transported packages 1 are unloaded at an unloading station 21 through which the endless belt 10 travels horizontally. The unloading station 21 includes means for pivoting the carrier members in the form of a stationary tilt bar 22 which is adapted to engage a contact portion in the form of a tilt surface 15 on each carrier member 11. As seen in FIG. 1, the tilt bar 22 is in contact with the tilt surface 15 of carrier member 11b. The carrier member 11b continues to be moved in the horizontal direction by the endless belt 10 while its tilt surface 15 is contacted by the stationary tilt bar 22, thus causing the carrier member 11b to pivot about its pivot opening 14. As the carrier member 11b pivots, the package 1d carried therein slides and falls therefrom. The carrier member 11b, now empty, is then transported in the direction shown by arrows 20 back to the loading station 7 to receive another package 1.

After sliding from the carrier member 11b, the package 1d falls onto and slides along a guide surface 23 to a waiting station 24. As seen in FIG. 1, a package 1e delivered to the waiting station 24 by a carrier member preceding the carrier member 11b is held in the waiting station until a next available peg 27 of a second conveyor 26 can receive the package thereon. As illustrated by the package 1f, once an available peg 27 has rounded an end pulley 28 of the conveyor 26, the package waiting in the wait station 24 drops downward through a positioning chute 25 onto the available peg 27. The second conveyor 26 then moves the package, as illustrated by package 1g, to a machine (not shown) for further processing.

Although the preferred embodiment has been described with respect to first and second conveyors having pegs for supporting packages thereon, the transport apparatus 9 of the present invention can be adapted to cooperate with other package transport devices.

With reference again to FIG. 2, the endless belt 10 in the preferred embodiment is a continuous chain formed of links 29 coupled to one another by bolts 30 which are passed through spacing washers 31. At regular intervals along the endless belt 10, fastening bolts 32 are provided to connect the carrier members 11 to the endless belt 10. Each fastening bolt 32 extends through a link 29 in lieu of a bolt 30 and extends through the pivot opening 14 of a carrier member 11. Washers 33 space the carrier members 11 from the links 29 while lock washers 34 on the fastening bolts 32 prevent the carrier members 11 from sliding thereoff.

Figure 3:
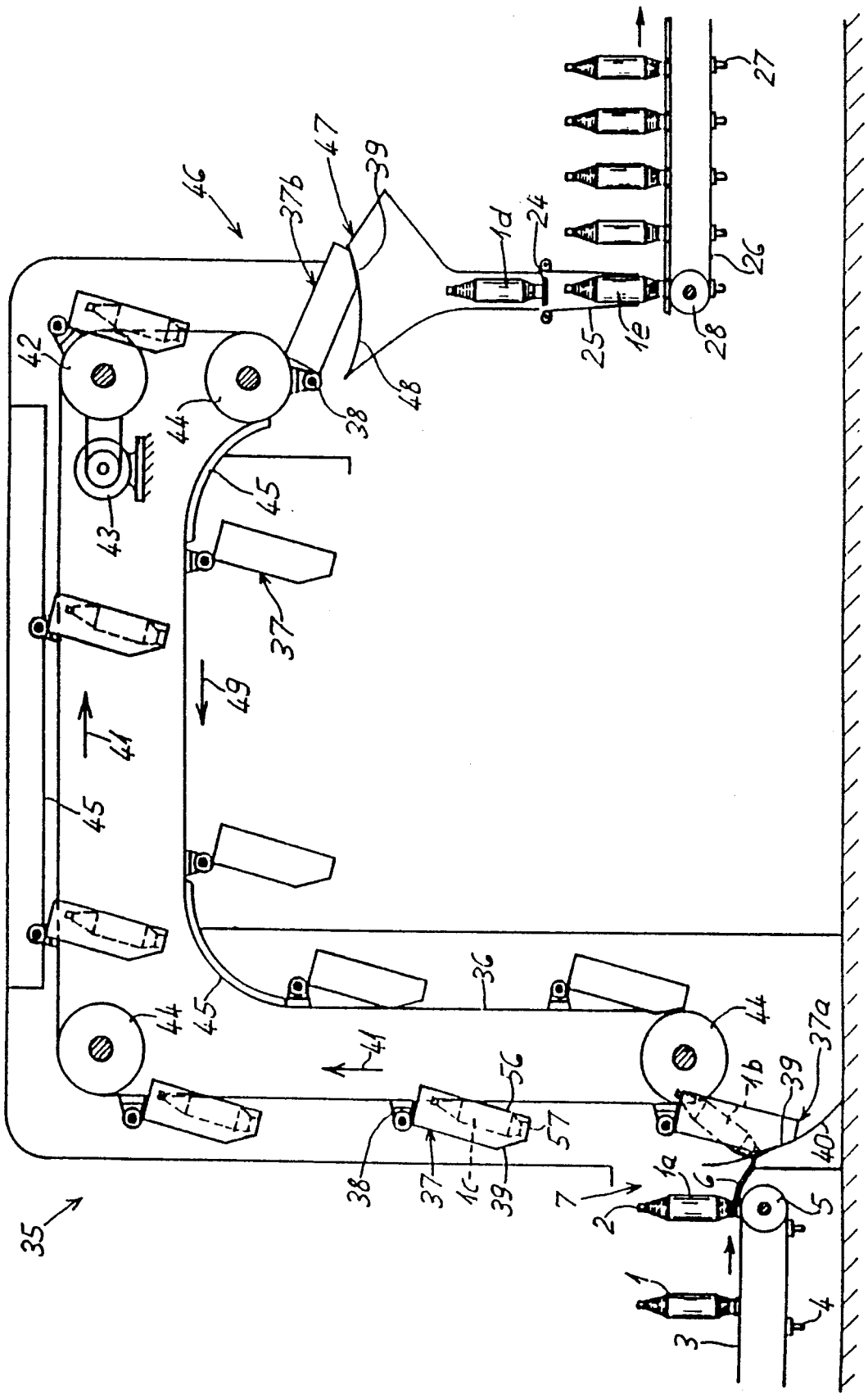
FIG. 3 is a side elevational view of another preferred embodiment of the transport apparatus of the present invention, showing the transport of packages in generally upright disposition from a first conveyor running from one yarn processing machine to a second conveyor running to another yarn processing machine.

With reference now to FIG. 3, a second embodiment of the present invention is illustrated. As discussed above with reference to the first embodiment, the conveyor 3 carries the packages 1 from one yarn processing machine (not shown) to the loading station 7. A transport apparatus 35 having an endless belt 36 and a plurality of carrier members 37 regularly spaced along the endless belt 36 is provided to transport the packages 1 to an unloading station. Each carrier member 37 is connected to the endless belt 36 by a coupling 38 and is free to pivot with respect to the coupling 38. Additionally, each carrier member 37 has a front opening and a lower surface 57 sloping upwardly from an upstanding rear surface 56 so that the packages 1 received therein are urged by the lower surface 57 to a lean against the rear surface wall 56.

The loading of each carrier member 37 at the loading station 7 is as follows. A guide surface 40 contacts a pivot portion, in the form of a laterally projecting tab 39 of each oncoming carrier member 37 to thereby pivot the bobbin carrier 37 into the proper position for receiving a package 1 and to prevent the carrier member 37 from uncontrollably swinging. To facilitate the contact between the carrier member 37 and the guide surface 40, a magnet can be provided on the surface 40 to cooperate with the tab 39, which may be correspondingly composed of a magnetic material. The magnet in the surface 40 then pulls the tab 39 of each carrier member 37 against the surface 40.

With further reference to the operation of the transport apparatus 35 illustrated in FIG. 3, a carrier member 37a is shown receiving a package 1b just as it slides off the removal blade 6. Simultaneously, another package 1a is being removed from the conveyor 3 by the removal blade 6. In the carrier member 37 downstream of the carrier member 37a, a package 1c is being vertically transported along the path indicated by the arrow 41. The endless belt 36 is driven by a drive pulley 42 driven by a motor 43. As the carrier member 37 continues along the path 41, the endless belt 36 travels over one of a plurality of pulleys 44 and thereafter travels in a horizontal direction.

As each carrier member 37 passes the pulley 44 at the upper left in FIG. 3 and begins to move in the horizontal direction, the coupling 38 of each carrier member is engaged by a first pair of horizontal guide rails 45. After completing their horizontal movement along the guide rails 45, the carrier members 37 are moved past the drive pulley 42 to an unloading station 46. At the unloading station 46, a removal mechanism 47 having a guide surface 48 engages the tab 39 of each carrier member 37 to pivot the carrier member and thereby allow the package therein to slide and fall therefrom. As shown in FIG. 3, a carrier member 37b has been tilted to a position in which the package carried therein can fall out of the front opening of the carrier member into the removal mechanism 47. As shown in FIG. 3, a package 1d which has been released from a carrier member 37 into the removal device 47 is held at a waiting station 24. Beneath the waiting station 24, a package 1e has been loaded onto an available peg 27 of the conveyor 26 after falling from the waiting station 24 through the positioning chute 25. The conveyor 26 carries the packages thereon to a machine (not shown) for further handling or processing of the packages.

Following the removal of the packages therefrom, the now-empty carrier members 37 are slid upward along a second pair of guide rails 45 to travel in the direction indicated by an arrow 49 back to the loading station 7 to receive another package.

Figure 4:
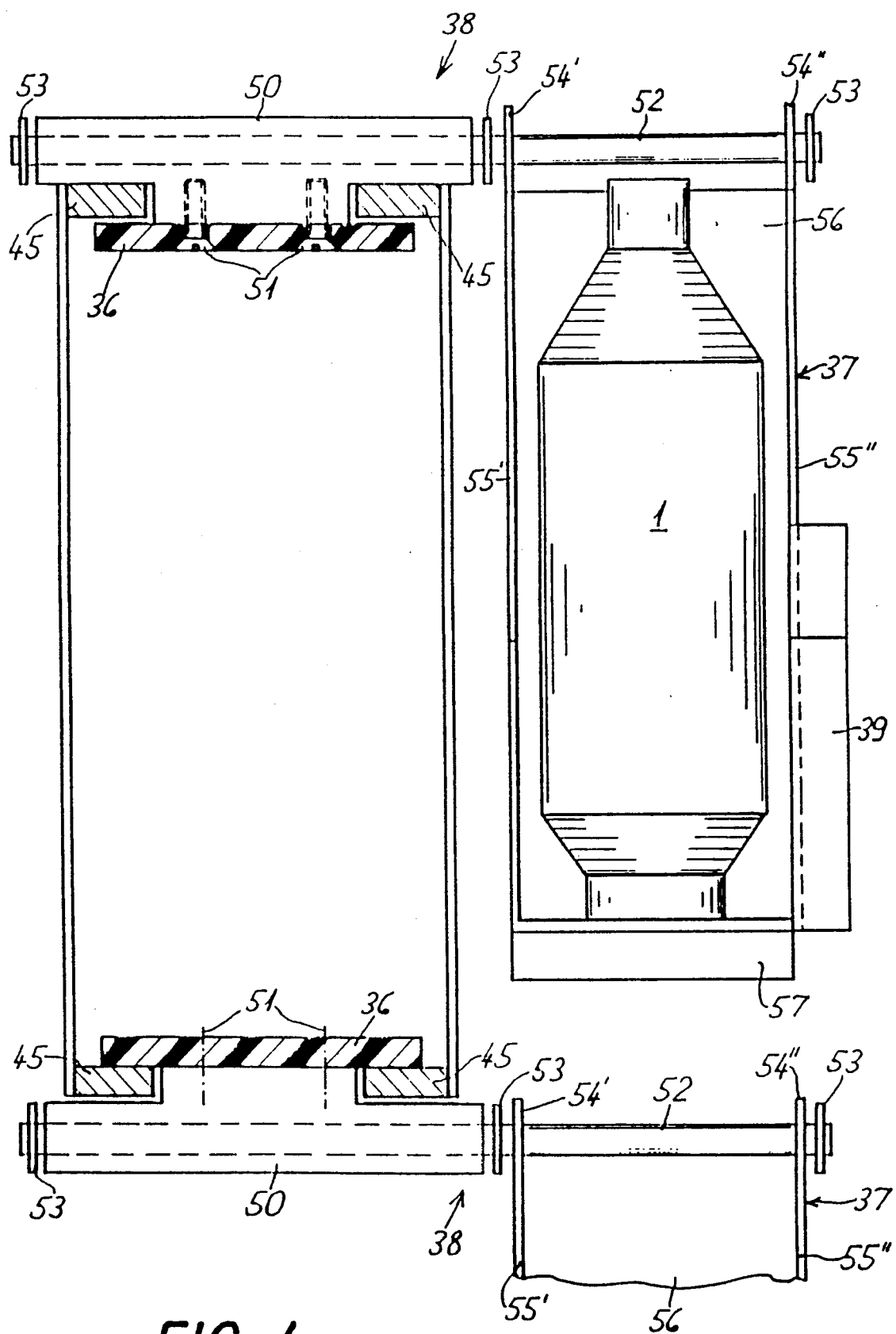
FIG. 4 is an end elevational view of one of the carrier members of the transport apparatus of FIG. 3, showing a package supported therein and showing the endless belt of the transport apparatus in vertical cross section.

With reference now to FIG. 4, each carrier member 37 is moved along the guide rails 45 in the following manner. The endless belt 36 lies on one side of the guide rails 45 and is connected by screws 51 to a member 50 which contacts the opposite sides of the guide rails 45. In addition to the member 50, the coupling 38 includes a fastening bolt 52 which extends transversely through the member 50 into the carrier member 37. A pair of lock washers 53 secure the member 50 to the fastening bolt 52. The carrier member 37 includes a pair of eyes 54' and 54" for receiving the fastening bolt 52 therein and a third lock washer 53 cooperates with one of the other lock washers 53 to secure the carrier member 37 to the fastening bolt 52. The eyes 54' and 54" are provided in the side walls 55' and 55", respectively, of the carrier member 37.

As shown in the upper half of FIG. 4, when the endless belt 36 moves along the underside of the first pair of guide rails 45, the member 50 rests on the opposite side of the guide rails 45 and thereby supports the weight of the carrier member 37 with the package 1 therein. Thus, the endless belt 36 is not subjected to undesirable wearing contact with the guide rails 45. As shown in the bottom half of FIG. 4, the endless belt 36 travels along the top of the second pair of guide rails 45 when the empty carrier members 37 are transported from the unloading station 46 to the loading station 7. In this circumstance, since the carrier members 37 are empty, the endless belt 36 is only subjected to a minimal downward pull so that the frictional contact between the endless belt 36 and the guide rails 45 is at a minimum.

Figure 5:
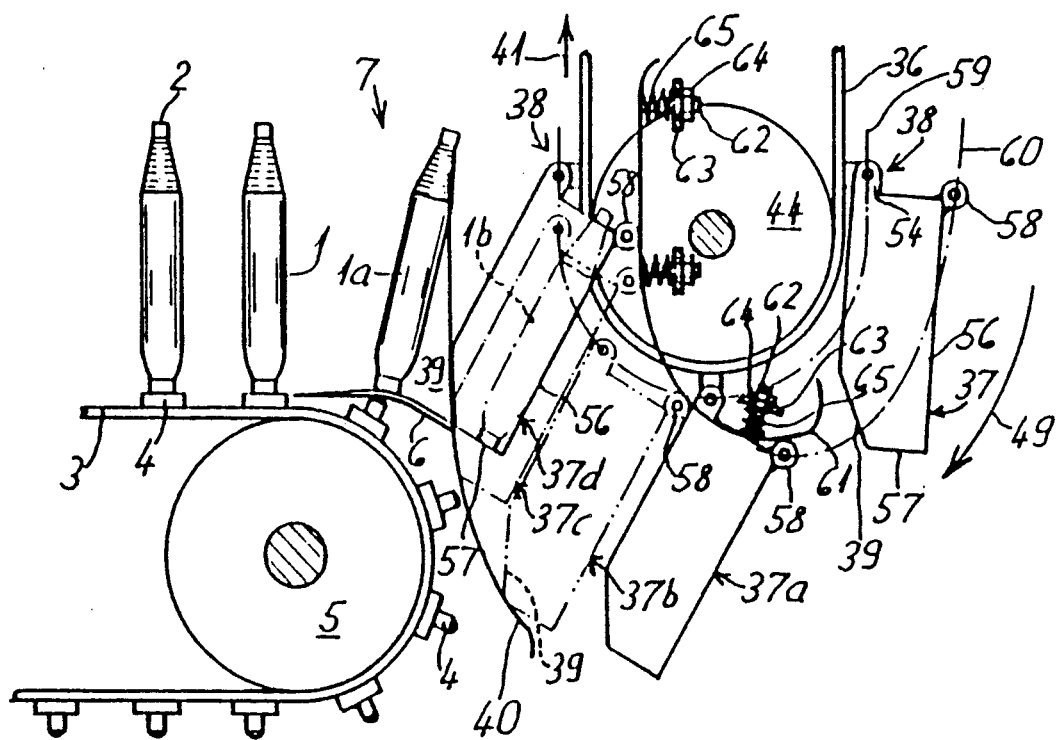
FIG. 5 is a side elevational view of a carrier member pivoting mechanism adapted to the transport apparatus of FIG. 3 for tilting the carrier members to a predetermined position for loading of packages therein.

With reference now to FIG. 5, another aspect of the transport apparatus 35 of FIG. 3 is illustrated. As the empty carrier members 37 approach the loading station 7, they are moved around the pulley 44 by the endless belt 36. Each carrier member 37 is provided with a roller 58. The roller 58 is adapted to cooperate with a guide rail 61 which is mounted across from, and following the contour of, the guide surface 40. The guide rail 61 is positioned with respect to the path 59 of the coupling 38 and the path 60 of the roller 58 such that the carrier member 37 is brought into a desired predetermined loading orientation just prior to contact by its tab 39 with the guide surface 40. Thereafter, the rail 61 and the guide surface 40 hold the carrier member 37 in its predetermined orientation as the carrier member is pulled upward by the endless belt 36 to the position at which it receives a package 1 from the removal blade 6.

The rail 61 is provided with adjustment screws 62 having nuts 64 threaded thereon for moving washers 63 along the length of the adjustment screws 62. Each adjusting screw 62 has a spring 65 positioned between its respective washer 63 and the rail 61 so that the rail 61 can be resiliently moved toward the washer as the roller 58 of the bobbin carrier 37 travels along the rails. By adjustment of the washers 63 along the fastening bolts 62, the guide rail 61 can be positioned so that each entering carrier member 37 is securely yet smoothly held in a predetermined orientation between the rail 61 and the guide surface 40.

As seen in FIG. 5, a carrier member 37d has just been loaded with a package 1b. The carrier member 37d is oriented in the desired loading orientation by the guide rails 61 and 40 so that the package 1b slides smoothly against the rear surface 56 of the carrier member. Once the carrier member 37d moves upward along the path 41 and clears the guide rails 61 and 40, it pivots to a position in which its center of gravity is vertically below the pivot point on its coupling 38. As the carrier member 37d travels in the direction of the path 41, another carrier member 37a enters the loading station 7 and its roller 58 contacts the rail 61. As the carrier member 37a continues its movement, its tab 39 contacts the guide surface 40 and the carrier member assumes the orientation illustrated by the phantom lines 37b. As the carrier member 37a continues to move upward, it moves into the position shown by the phantom lines 37c in which its tab 39 is fully in contact with the guide surface 40. The carrier member 37a is now in a position to smoothly receive the next available package 1a as it slides off the removal blade 6. As can be understood, the guide rail 61 and the guide surface 40 insure that each package 37 does not pivot freely as it receives a package 1 therein.

When each carrier member 37 reaches the receiving position as illustrated by the carrier member 37d in FIG. 5, its lower surface 57 is at the same height as the removal blade 6 so that the package 1 sliding off the removal blade 6 slides smoothly into the carrier member and comes to rest at the rear surface 56.

In a further embodiment of the present invention, the side walls 55' and 55" of each carrier member 37 can be provided with bolts for contacting the guide surface 40 in lieu of a tab 39.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. An apparatus for transporting yarn packages from one yarn processing machine to another yarn processing machine, comprising:

an endless belt extending between said machines;

means for driving said belt;

a plurality of package carrier members having means for supporting packages thereon, each of said package supporting means including a lower surface and a generally upstanding surface with said lower surface sloping upwardly from said upstanding surface to support a package with one end on said lower surface and in leaning disposition against said upstanding surface;

pivot connections mounting said carrier members at spaced intervals on said belt in freely pivotal hanging disposition for maintaining said supporting means in package supporting deposition as said carrier members travel on said belt from one machine to the other; and means adjacent said other machine for pivoting said carrier members with respect to said endless belt to release the supported packages therefrom as said carrier members travel thereby.

2. An apparatus for transporting yarn packages from one yarn processing machine to another yarn processing machine according to claim 1 and characterized further in that said package supporting means are generally U-shaped for supporting packages thereon with the axes of the packages generally horizontal.

3. An apparatus for transporting yarn packages from one yarn processing machine to another yarn processing machine according to claim 2 and characterized further in that said U-shaped package supporting means hang freely below said pivot connection during movement of said carrier members as said belt travels from one machine to the other.

4. An apparatus for transporting yarn packages from one yarn processing machine to another yarn processing machine according to claim 1 and characterized further in that said upstanding surface is rearward of said lower surface with respect to the direction of travel of said carrier member from one machine to the other.

5. An apparatus for transporting yarn packages from one yarn processing machine to another yarn processing machine according to claims 1, 2, 3 or 4 and characterized further in that said means for pivoting said carrier members comprises a stationary member disposed in the path of said carrier members and engagable therewith at a spacing from said pivot connections for pivoting said carrier members as they travel in contact therewith to permit packages to fall from said carrier members.

6. An apparatus for transporting yarn packages from one yarn processing machine to another yarn processing machine according to claim 5 and characterized further in that each of said carrier members includes a contact portion spaced from its respective pivot connection for contacting by said stationary member for pivoting of said carrier member.

7. An apparatus for transporting yarn packages from one yarn processing machine to another yarn processing machine according to claims 1, 2 or 3 and characterized further in that each of said pivot connections comprises a member about which said carrier member freely pivots, said member extending across the width of said endless belt and secured thereto, whereby said carrier members are disposed laterally of said endless belt.

8. An apparatus for transporting yarn packages from one yarn processing machine to another yarn processing machine according to claim 7 and characterized further by means, adjacent at least a portion of the path of travel of said endless belt, for supporting the weight of each of said carrier members during movement of said endless belt therealong.

9. An apparatus for transporting yarn packages from one yarn processing machine to another yarn processing machine according to claim 6 and characterized further in that said contact member of each of said carrier members projects laterally therefrom.

10. An apparatus for transporting yarn packages from one yarn processing machine to another yarn processing machine according to claim 4 and characterized further by a pair of spaced guide members disposed adjacent said one machine and engagable with said carrier members at spaced locations thereon for pivoting thereof into package receiving disposition as said carrier members travel therepast.

11. An apparatus for transporting yarn packages from one yarn processing machine to another yarn processing machine according to claim 10 and characterized further in that said pair of spaced guide members are disposed relative to each other and the pivot connections of said package carriers guided therebetween such that said package carriers are prevented from substantial free pivoting during loading of a package therein.

* * * * *